United States Patent
Hu

(10) Patent No.: US 9,723,266 B1
(45) Date of Patent: Aug. 1, 2017

(54) LIGHTWEIGHT CONTENT AWARE BIT STREAM VIDEO QUALITY MONITORING SERVICE

(75) Inventor: Jing Hu, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 13/290,649

(22) Filed: Nov. 7, 2011

(51) Int. Cl.
*H04N 7/00* (2011.01)
*H04N 7/173* (2011.01)

(52) U.S. Cl.
CPC .................................. *H04N 7/173* (2013.01)

(58) Field of Classification Search
CPC ........ H04N 19/46; H04N 19/61; H04N 19/00; H04N 19/70; H04N 19/436
USPC ...................................................... 375/240.1
See application file for complete search history.

(56) References Cited

U.S. PATENT DOCUMENTS

| | | | |
|---|---|---|---|
| 5,446,492 A | 8/1995 | Wolf et al. | |
| 8,356,327 B2 * | 1/2013 | van Beek | 725/105 |
| 2005/0281333 A1 | 12/2005 | Ghanbari | |
| 2011/0249127 A1 | 10/2011 | Zhang et al. | |

FOREIGN PATENT DOCUMENTS

WO   WO 2005-060272 A1   6/2005

OTHER PUBLICATIONS

Chou et al "Rate-Distortion Optimized Streaming of Packetized Media", IEEE Transactions on Multimedia, vol. 8, No. 2, Apr. 2006.*
Chakareski et al. "RaDiO Edge: Rate-Distortion Optimized Proxy-Driven Streaming From the Network Edge", IEEE/ACM Transactions on Networking, vol. 14, No. 6, Dec. 2006.*
Hu et al. "Use of Content Complexity Factor in Video Over IP Quality Monitoring".
Feng Xao "DCT-based Video Quality Evaluation" 2000.
Yang et al. "Perceptual Temporal Quality Metric for Compressed Video" IEEE vol. 9, No. 7, Nov. 2007.
Pastrana-Vidal et al. "Automatic Quality Assessment of Video Fluidity Impairments Using a No-Reference Metric".
Votalin et al., MSU Graphics & Media Lab: "MSU Video Quality Measurement Tool" 2001.
Wang et al.: "Image Quality Assessment: From Error Visibility to Structural Similarity" IEEE vol. 13, No. 4, Apr. 2004.

(Continued)

*Primary Examiner* — Frank Huang
(74) *Attorney, Agent, or Firm* — Patterson + Sheridan, LLP

(57) ABSTRACT

Described in an example herein is an apparatus that comprises video quality monitoring logic operable to receive data representative of a video stream that includes one or more frames and to produce data representative of an estimated mean opinion score for the video stream. The video quality monitoring logic is operable to determine a scene complexity and a level of motion for the video stream. The video quality monitoring logic is operable to determine a mean square error for frames belonging to the plurality of frames. The video quality monitoring logic is operable to determine the estimated mean opinion score for the video stream based on compression distortion determined from an average of the mean square error for frames belonging to the one or more frames, the scene complexity, the level of motion, and a frame rate for the video stream.

17 Claims, 2 Drawing Sheets

(56) References Cited

OTHER PUBLICATIONS

Wolf et al., National Telecommunications and Information Administration: "Video Quality Measurement Techniques" Jun. 2002.
Opticom GmbH: "Advanced Perceptual Evaluation of Video Quality" 2005.

* cited by examiner

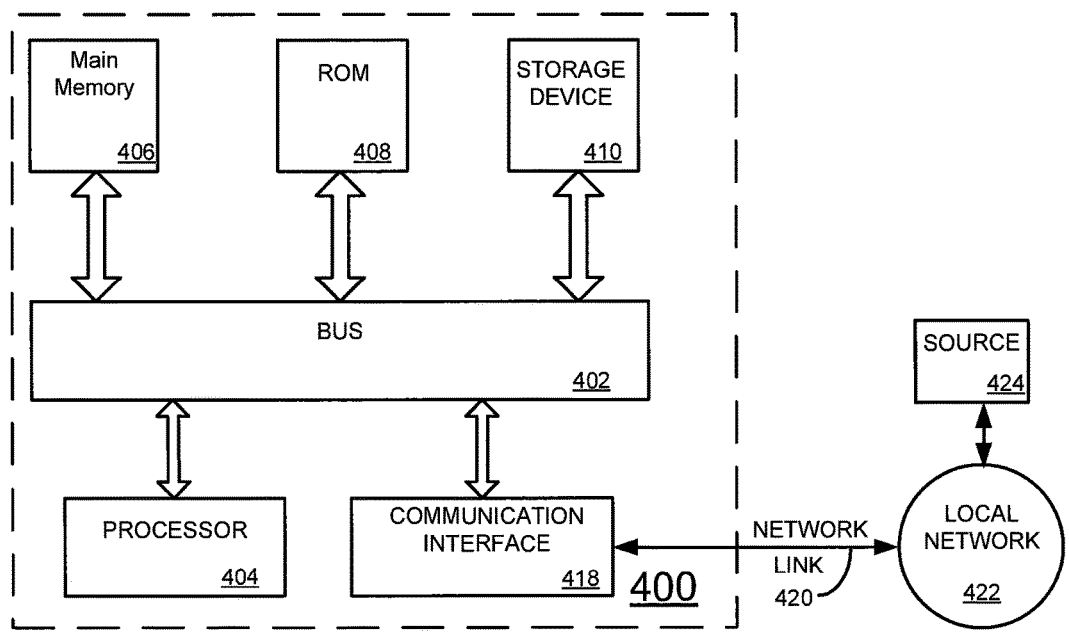
FIG. 4
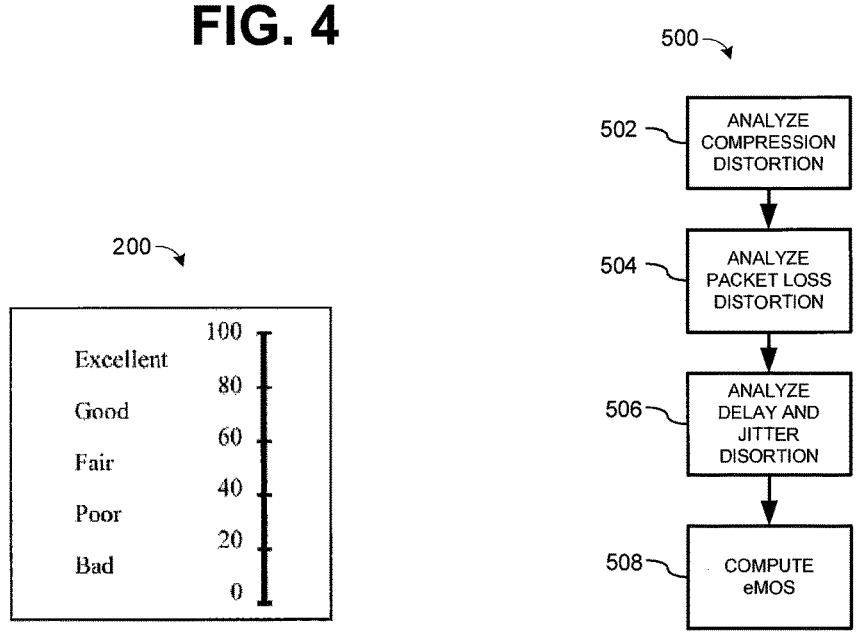
FIG. 2
FIG. 5

US 9,723,266 B1

LIGHTWEIGHT CONTENT AWARE BIT STREAM VIDEO QUALITY MONITORING SERVICE

TECHNICAL FIELD

The present disclosure relates generally to both real time and non real time streaming data such as streaming video data.

BACKGROUND

Over the past two decades, digital video compression and communication have fundamentally changed the way people create, communicate and consume visual information. As a vital part of the fast advancing video technologies, measuring and monitoring the delivered video quality has also attracted a significant amount of interest. Currently, most of the research and established international standards for video quality measurement (VQM) have focused on pixel level video quality measures.

BRIEF DESCRIPTION OF THE DRAWINGS

The accompanying drawings incorporated herein and forming a part of the specification illustrate the example embodiments.

FIG. 2 illustrates an example for interpreting a mean opinion score.

FIG. 4 is a block diagram of a computer system upon which an example embodiment may be implemented.

FIG. 5 is a block diagram illustrating a methodology in accordance with an example embodiment.

OVERVIEW OF EXAMPLE EMBODIMENTS

Figure 1:
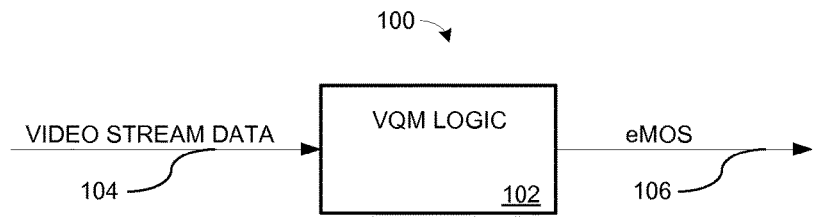
FIG. 1 is a block diagram illustrating an example of an apparatus for performing video quality analysis.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising video quality monitoring logic operable to receive data representative of a video stream that comprises a plurality of frames and to produce data representative of an estimated mean opinion score for the video stream. The video quality monitoring logic is operable to determine a scene complexity for the video stream. The video quality monitoring logic is operable to determine a level of motion for the video stream. The video quality monitoring logic is operable to determine a mean square error for frames belonging to the plurality of frames. The video quality monitoring logic is operable to determine the estimated mean opinion score for the video stream based on compression distortion determined from an average of the mean square error for frames belonging to the plurality of frames, the scene complexity, the level of motion, and a frame rate for the video stream.

In accordance with an example embodiment, there is disclosed herein, logic encoded in a non-transitory computer readable medium for execution by a processor, and when executed operable to determine scene complexity for a video stream that comprises a plurality of video frames and determine a level of motion for the video stream. The logic is further operable to determine a location and a severity level for lost packets and determine packet loss distortion based on an average error severity for lost packets, a maximum packet loss severity, complexity of the video stream, and level of motion of the video stream. The logic is operable to determine an estimated mean opinion score for the video stream based on the packet loss distortion.

In accordance with an example embodiment, there is disclosed herein, a method comprising determining scene complexity for a video stream that comprises a plurality of video frames and determining a level of motion for the video stream. The mean square error for frames belonging to the plurality of video frames is determined. The compression distortion of the video stream is determined from an average of the mean square error for frames belonging to the plurality of frames, the scene complexity, the level of motion, and a frame rate for the video stream. The mean square error for an intra-coded picture frame is determined differently than the mean square error for predicted picture frame. An estimated mean opinion score for the video stream is determined based on the compression distortion of the video stream.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a light weight content aware bit stream video quality monitoring (VQM) service that estimates the perceptual quality of a compressed and transmitted video stream. In an example embodiment, the VQM service parses video header information to perform the analysis. For example, header information such as the picture header and group of blocks (GOB) header for H.263 video stream is analyzed. As another example, header information such as the sequence parameter set (SPS), picture parameter set (PPS), and slice header of a H.264 video stream is analyzed. The VQM service analyzes the video quality degradation caused by "Compression Distortion" which is a function of the compression rate (translated to bits per pixel to separate the spatial and temporal resolutions from the bit rate), the frame rate, the video codec implemented, the group of picture (GOP) structure used and the video content. When there is packet loss "Packet Loss Distortion" which depends on the packet loss pattern, GOP structure, packet loss concealment, and again the video content are analyzed. In particular embodiments, when there is packet delay and/or jitter, video quality degradation caused by the delay and jitter are analyzed. Based on the analysis, the VQM service may calculate an estimated Mean Opinion Score (eMOS) value, which can be provided on a continuous basis employing a scale from 0 to 100, which will be described in more detail herein infra.

An aspect of this VQM service is that it calculates video content parameters such as scene complexity and amount of motion and incorporates these video content parameters to the calculation of overall video quality. Thus, the estimated video quality can accommodate vastly different video content intensity levels of individual video streams.

Another aspect of the VQM service is that it breaks down the quality of delivered video stream to quality degradation caused by compression, quality degradation caused by packet loss, and quality degradation caused by delay and jitter. This breakdown helps the users of this VQM service to troubleshoot the source of video quality degradation.

Yet another aspect of the VQM service is that it analyzes the slice header of each received video packet to associate both the received and the potentially lost video packets to their location in the video pixel domain. Together with the information retrieved from RTP (Real Time Protocol) headers and the usage of a set of heuristic models, the VQM service can estimate the delivered video quality much more accurately than network layer models that simply count parameters such as video bit rate and packet loss rate.

Still yet another aspect of this VQM service is that it achieves all the aforementioned designs without a reference video and without decoding the payload of a video bit stream. The light weight feature makes the VQM service readily scalable.

FIG. 1 is a block diagram illustrating an example of an apparatus 100 for performing video quality monitoring (VQM) analysis. VQM logic 102 receives video stream data 104, such as data representative of a video stream or a video stream. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. VQM logic 102 analyzes the video stream data 104 and produces an estimated Mean Opinion Score (eMOS) value 106.

In an example embodiment, the VQM logic 102 is operable to determine a scene complexity for the video stream and to determine a level of motion for the video stream. The VQM logic 102 is further operable to determine a mean square error for frames belonging to the plurality of frames. The VQM logic 102 determines on compression distortion for the video stream from an average of the mean square error for frames belonging to the plurality of frames, the scene complexity, the level of motion, and a frame rate for the video stream. The VQM logic 102 determines the estimated mean opinion score 106 for the video stream based on the compression distortion.

In an example embodiment, VQM logic 102 determines mean square error for an intra-coded picture frame ("I frame") based on bits per pixel and scene complexity. In particular embodiments, a mean square error for a predicted picture frame ("P fame) is based on bits per pixel, scene complexity, level of motion, and an average quantization parameter for predicted picture frame. As will be described herein infra, the mean square error for P frames may be computed differently based on a predetermined threshold value of bits per pixel.

In an example embodiment, VQM logic 102 may also determine packet loss distortion of the video stream from video stream data 104. The eMOS 106 determined by VQM logic can be based on compression distortion and packet loss distortion.

In an example embodiment, packet loss distortion can be based on location of lost packets. In particular embodiments, packet loss distortion is further based on whether a lost frame is an I frame or a P frame and/or whether a reference frame was received for the lost frame. Packet loss distortion for a sequence of video frames can be determined from an average error severity of lost packets, a maximum packet loss severity, scene complexity, and level of motion.

In an example embodiment, VQM logic 102 also employs packet delay distortion (e.g., distortion caused by delay and/or jitter) for determining eMOS 106. The packet delay distortion is based on an average delay over a predetermined time period. The eMOS 106 may be based on any combination of compression distortion, packet loss distortion, and delay distortion such as compression distortion and packet delay distortion, packet loss distortion and packet delay distortion, or compression distortion, packet delay distortion, and packet delay distortion.

FIG. 2 illustrates an example 200 for interpreting an estimated mean opinion score (eMOS). The example 200 illustrates a scale from 0 to 100, where 0 is the worse score, and 100 is considered the best score. In the illustrated example, 0-20 is considered bad, 20-40 is poor, 40-60 is fair, 60-80 is good, and 80-100 excellent. This scale is used in describing the example embodiments herein, however, those skilled in the art can readily appreciate that the formulas provided herein can be adjusted to accommodate any suitable scale and thus the example embodiments described herein should not be construed as limited to the scale used herein. The scale was merely selected for ease of illustration.

Figure 3:
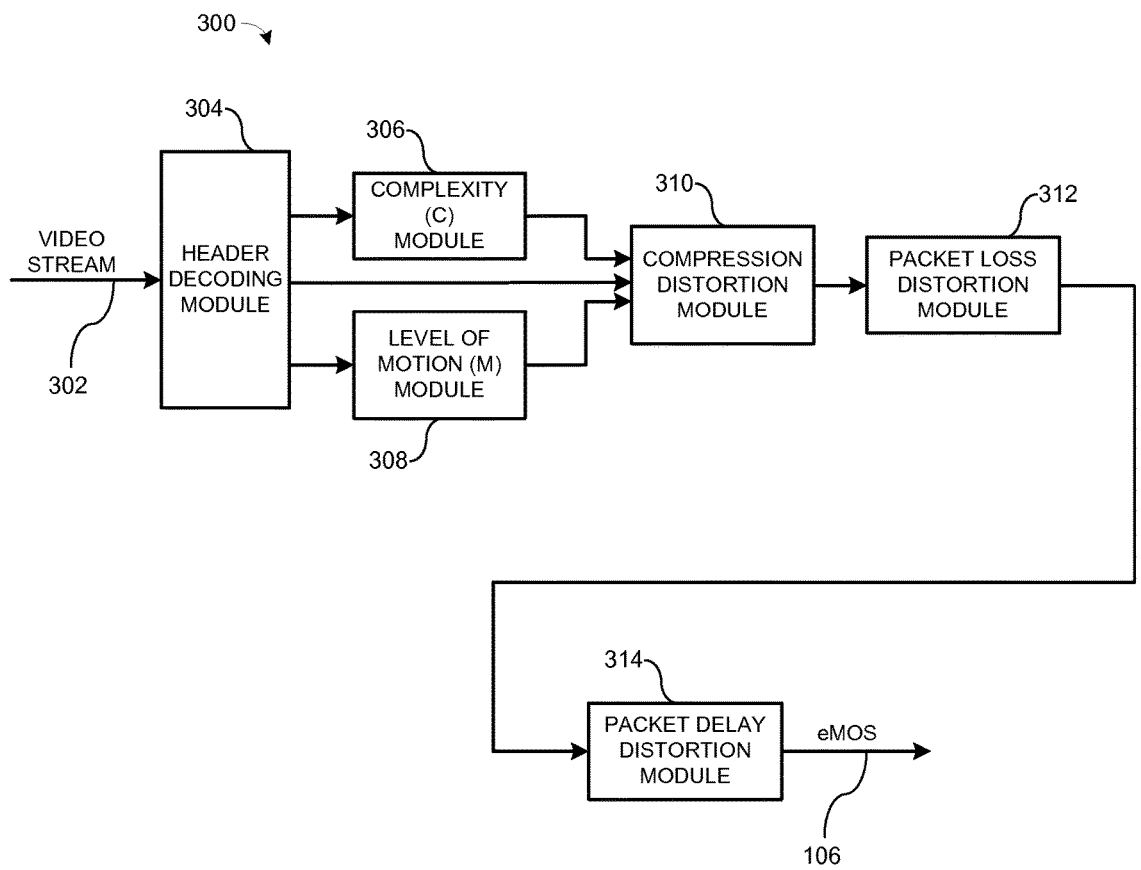
FIG. 3 is a functional block diagram illustrating an example of an apparatus for providing video quality monitoring service.

FIG. 3 is a functional block diagram illustrating an example of an apparatus 300 for providing video quality monitoring service. Header module 302 receives a video stream 104. In an example embodiment, header module 302 decodes the network header and real time protocol (RTP) header of the video stream 104. In particular embodiments, the header module 302 obtains additional header information based on the type of video stream being analyzed. For example, for analyzing a H.263 video stream, the header module 302 decodes the picture header and group of blocks (GOB) header. For a H.264 video stream, the header module 302 may obtain header information such as the sequence parameter set (SPS), picture parameter set (PPS), from the slice header. An aspect of an example embodiment is that an estimated mean opinion score (eMOS) 106 can be determined without having to decode the video content of the video stream and/or without employing a reference video.

The scene complexity module 306, receives video stream data from header decoding module 304. The scene complexity module 306 determines scene complexity (C) which is employed in evaluating compression loss and packet loss. In an example embodiment, the scene complexity module 306 employs the following formula to calculate scene complexity (C):

Equation 1 Formula for scene complexity (C)

$$C = \frac{\text{Bits}_I}{40 \times FS \times 0.9^{QP_I}} \text{ and } C \in [0, 1]$$

where

Bits$_I$ is number of bits of a coded Intra (I-) frame;
QP$_I$ is average quantization parameter of an I-frame;
FS is frame size in number of pixels.

The level of motion module 308, receives video stream data from header decoding module 304. The level of motion module 308 determines the level of motion (M) which is employed in evaluating compression loss and packet loss. In an example embodiment, the level of motion module 308 employs the following formula to calculate the level of motion (M):

Equation 2 Formula for level of motion (M)

$$M = \frac{\text{Bits}_P}{100 \times FS \times C^{1.2} \times 0.87^{QP_P}} \text{ and } M \in [0, 1]$$

where

C is scene complexity of the video;
Bits$_P$ is number of bits of a coded Inter (P-) frame;
QP$_P$ is average quantization parameter of a P-frame;
FS is frame size in number of pixels.

In the illustrated example, the values chosen for the constants in the above two formulas are the following. A total of 52 values of quantization step sizes are supported in Advanced Video Coding (AVC)/H.264 and they are indexed by Quantization Parameters (QPs). Their values are arranged so that an increase of 6 in QP means doubling quantization step sizes. Therefore, an increase of 1 in QP corresponds to a reduction of bit rate in residue (e.g., the luminance coefficients and the chrominance coefficients combined) coding by approximately $1-(½)^{⅙}=11\%$. Furthermore, video compression is a dynamic process and the intra- and inter-frame prediction conducted is altered accordingly when different QPs are employed. As a result of heuristics, the value in the denominator of the two proposed formula are altered from $1-11\%=0.89$ to 0.9 and 0.87, respectively.

Compression distortion module 308 analyzes the video quality degradation caused by compression distortion as a function of the compression rate (translated to bits per pixel (or "Bpp") to separate the spatial and temporal resolutions from the bit rate), the video codec implemented, the group of picture (GOP) structure and the video content parameters, Complexity (C) and Level of Motion (M).

The bits spent on coding an Intra-coded picture frame ("I frame") are mostly consumed by the luminance and chrominance coefficients (more than 97% combined). The bits spent on coding a P frame are more spread out: on average about 15% are spent on coding slice headers and different levels of coding modes; about 25% are spent on coding without loss of the motion vectors; and the remaining 60% of the total bits are spent on coding the luminance and chrominance coefficients. The percentages change with different coding parameters. This difference between I frame and P frame can make modeling mean square error of a P frame much more difficult than modeling that of an I frame. In particular, as the quantization parameter increases, the bits spent on coding overhead, motion vectors and residue values all decrease, but the percentage of the bits spent on coding overhead and motion vectors actually increases, in an approximately linear fashion.

The compression distortion of a Predicted picture ("P frame") not only depends on the characteristics (in this model, level of motion) and the bits spent on coding this frame, but also the error that's propagated from the reference frame(s). This error propagation, however, is not from the predictive coding itself, but rather the interaction between the motion estimation and quantization. For a video frame and its reference frame, if the reference frame is quantized very coarsely, i.e., the compression distortion of the reference frame is high, the reconstructed reference frame will be less similar to the original reference frame. In this case, when the motion estimation is conducted, the residue after motion estimation is complex. When the same amount of quantization is done on the residue, the compression distortion of the current video frame is larger than if the reference video frame had been compressed with less distortion.

In an example embodiment, the following formulas are employed to approximate the average over the mean square error (MSE) of the luminance and two chrominance values of individual frames of a video sequence. The parameters in the formulas are chosen heuristically. Bpp in these formulas refers to bits per pixel.

For I frames,

Equation 3 Formula for estimated MSE of an I frame $$\hat{e}_I = \left(\frac{48}{B_{pp}} - 8\right)C^2$$

For P frames where Bpp<0.3

Equation 4 Formula for estimated MSE of a

P frame if bits per pixel $(B_{PP}) < 0.3$ $$\hat{e}_P = \frac{117820}{B_{pp}^{2.5}} \cdot C^{3.8} \cdot M^{2.5} \cdot 0.78^{QP_P}$$

And for P frames where Bpp≥0.3

Equation 5 Formula for estimated MSE of a

P frame if bits per pixel $(B_{PP}) \geq 0.3$ $$\hat{e}_P = \left(\frac{117820}{B_{pp}^{2.2}} - 3805\right) \cdot C^{3.8} \cdot M^{2.5} \cdot 0.78^{QP_P}$$

In an example embodiment, a pooling function is employed to convert the approximate MSE's of individual video frames to an estimated Mean Opinion Score (eMOS) of a few seconds of video. For this example, an uncompressed digital video with its native resolution captured at 60 frames per second is considered of "perfect" quality, an eMOS of 100 out of 100. In an example embodiment, the pooling function is:

Equation 6 Formula for overall eMOS without packet loss or delay $$MOS = \left(100 - 0.8 \times \frac{\text{avg}(\min(\hat{e}, 250))}{C^2 \times M^{0.4}}\right)\left(\frac{\log_2 FR}{\log_2 600}\right)$$

The packet loss distortion module 312 receives the output from the compression distortion module 310. In an example embodiment, rather than simply count the number of lost packets, the location of the loss packet(s) on a video frame is found first; the severity of the packet loss on the current video frame is then assessed based on whether the current video slice is an I slice or a P slice and on whether a reference frame has been received. The propagation of the packet loss to the following frames, which might or might not contain any packet loss themselves, are also determined. On the other hand if an I slice is received, the end of error propagation is also taken into account. The total packet loss distortion is then pooled together and weighed against the scene complexity and level of motion of the video. For each video frame, the location of lost Macroblocks (MBs) in the video frame is determined, a loss severity caused by the lost MB is assigned, and a loss severity of the received MB's propagated from a reference frame is determined.

The location of the lost Macroblocks (MB's) in the video frame is achieved by assessing the RTP sequence number, RTP timestamp, video frame number, and the first MB address of the received video packets. For example, after the four parameters of the three successively received RTP packets are extracted as in the following table,

TABLE 1

An example of three successively received packets

|  | RTP sequence number | RTP timestamp | video frame number | first MB address |
|---|---|---|---|---|
| 1st packet | 278 | 0x6DDD0 | 150 | 0 |
| 2nd packet | 281 | 0x6DDD0 | 150 | 302 |
| 3rd packet | 282 | 0x6E988 | 151 | 0 |

A determination is made that video frame #150 is composed of a received packet, followed by two lost packets (with sequence numbers 279 and 280), then followed by one received packet. However, since the address of the last MB of a video slice/GOB is not specified in the slice/GOB header, the boundary between the lost MB's and previously received MB's has to be estimated. In this example, the one received packet and two lost packets cover MBs #0 to #301, so an estimation can be made that the first (301−0+1)*1/(1+2)=101 MBs are received; and the 301−0+1−101=201 MBs are lost.

Each MB is assigned a parameter called "loss_severity". Once a MB is tagged as lost, it's loss_severity parameter is assigned a value such as MAX_PKT_LOSS_SEVERITY_I or MAX_PKT_LOSS_SEVERITY_P, depending on the slice/GOB type of the received packets of the same video frame.

For each MB which is in fact received in the current video frame, the loss_severity values of its collocated MBs in the reference frame are then examined. The collocated MBs are within offsets MAX_MV_h and MAX_MV_v from the MB in the current video frame. The median value of all the loss_severity's of the collocated MBs is taken, and then subtracted by a constant LOSS_SEVERITY_ATTENUATION. This is the value of the error_severity of the current received MB due to error propagated from previously lost packets. The LOSS_SEVERITY_ATTENUATION parameter is designed into the algorithm because the common knowledge that the error introduced by packet loss decay over a sequence of frames due to the explicit or implicit spatial filtering in the decoder.

The above calculates the value of parameter error_severity for all MBs of a sequence of video frames. In an example embodiment, the average error_severity is input into equation 7 below. The eMOS without packet loss is calculated in Equation 6 Formula for overall degradation due to packet loss, employs equation 7 as a multiplier. Since the nonlinearity of the packet losses and their propagations are exploited for individual MB's, linearity is used for its simplicity in the pooling function when calculating the average. The DMOS is weighed against the two content parameters scene complexity (C) and level of motion (M), described herein supra since packet loss can be a less perceptual annoyance when the video scene is complex and when there is a high motion in the video as viewers' attention is drawn to parse the scene and motion themselves.

Equation 7 Formula for overall eMOS degradation due to packet loss $$DMOS_{pktloss} = MOS \times \frac{\text{avg(error\_severity)}}{\text{MAX}_{pkt\_loss\_severity\_I}} \times \frac{1.5}{C \times M}$$

The effect of packet loss on the video quality degradation is dependent on specific video codec implementations. For example if a decoder implements a more advanced error concealment algorithm in the decoder, the decoder should be able to recover more lost information than a decoder with a less effective error concealment algorithm. Therefore, the packet loss distortion algorithm in this example has five parameters embedded. By choosing optimal values for these five parameters, the packet loss distortion can be customized to accommodate a specific endpoint or MCU. In the aforementioned example, the decoder with better error concealment scheme will have smaller values for the two parameters MAX_PKT_LOSS_SEVERITY_I and MAX_PKT_LOSS_SEVERITY_P, i.e., the impact of the packet loss on the loss frames is smaller as the errors are concealed better.

TABLE 2

To customize the packet loss distortion for an endpoint/MCU

| Parameter Name | Customization relevance | values chosen for reference JM codec |
|---|---|---|
| MAX_PKT_LOSS_SEVERITY_I | Encoder w/ coding; error resilient Decoder w/ error concealment | 100 |
| MAX_PKT_LOSS_SEVERITY_P |  | 10 |
| LOSS_SEVERITY_ATTENUATION |  | 1 |
| MAX_MV_h | Encoder only | 32 for CIF and below; 64 for 4CIF and about; 128 for 720p and above |
| MAX_MV_v |  | Same as MAX_MV_h |

In some cases even when a video packet is received, its payload may not be really usable for decoding. For example, if the first packet of an H.264 fragmented NAL (Network Abstraction Layer) is lost, subsequent correctly received packets of that fragmented NAL are not usable in decoding.

The same situation occurs to H.263 packets following packet losses without a proper GOB header in the payload.

The output of the packet loss distortion module 312 is input into the packet delay distortion module 314. Packet delay distortion module 314 determines a perceptual fluctuation in a video stream caused by time fluctuations such as delay and jitter.

In an example embodiment, packet delay distortion module 314 determines the delay and jitter of packets by comparing the time difference that consecutive frames are received and their RTP time stamps. The RTP time stamps give information on the designed time difference of successive frames. They are compared with the actual time when each frames are received to calculate delay and jitter eMOS drop. A timeline of the receiving times of the video frames can be established. A delay and jitter eMOS degradation value can be computed based on an average delay. For example, a delay and jitter degradation value of 10 can be assigned for every 100 ms of video frame fluctuation (e.g., if the average delay is 100 ms, then a delay and jitter eMOS degradation value of 10 is used, if the average delay is 200 ms, then a delay and jitter eMOS degradation value of 20 is used, etc.). The delay and jitter degradation value is subtracted from the output of packet loss distortion module 312 to obtain the overall eMOS 106. Those skilled in the art should readily appreciate that any suitable technique for determining time fluctuations may be employed in determining the degradation of perceptual quality of a streaming video. Therefore, in alternative embodiments, more sophisticated methods to quantify the perceptual quality of a video stream due to time fluctuations can be employed.

In an example embodiment, the overall eMOS 106 obtained from packet delay and distortion module 312, using the 0-100 scale described in FIG. 2, can be described as 100−compression distortion−packet loss distortion−packet delay distortion. However, in particular embodiments not all of the aforementioned parameters are employed, for example overall eMOS=100−compression distortion; or 100−packet loss distortion; or 100−compression distortion−packet delay distortion; or 100−packet loss distortion−packet delay distortion, etc. Those skilled in the art should readily appreciate that the constants employed in equations 1-7 are merely to illustrate an example embodiment and that they may vary based on the properties of the video stream being analyzed.

FIG. 4 is a block diagram of a computer system upon which an example embodiment may be implemented. Computer system 400 is suitable for implementing VQM logic 102 in FIG. 1, and/or any of header decoding module 304, complexity module 306, level of motion module 308, compression distortion module 310, packet loss distortion module 312, and packet delay distortion module 314.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for video quality monitoring. According to an example embodiment, video quality monitoring is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps and/or functionality described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media includes, for example, optical or magnetic disks, such as storage device 410. Volatile media includes dynamic memory such as main memory 406. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a network link 420 that is connected to a local network 422. For example, communication interface 418 may be a local area network (LAN) card to provide a data communication connection to a compatible LAN. As another example, communication interface 418 may be an integrated services digital network (ISDN) card or a modem to provide a data communication connection to a corresponding type of telephone line. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a source of a video stream (e.g., a server, switch, and/or router) 424.

In view of the foregoing structural and functional features described above, a methodology 500 in accordance with an example embodiment will be better appreciated with reference to FIG. 5. While, for purposes of simplicity of explanation, the methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodology 500 described herein is suitably adapted to be implemented in hardware, software, or a combination thereof. For example, methodology 500 may be implemented by VQM logic 102 (FIG. 1), modules 304, 306, 308, 310, 312, 314 (FIG. 2), and/or computer system 400 (FIG. 4).

At 502, compression distortion is computed. In an example embodiment, compression distortion is based on an average mean square error, frame rate, scene complexity, and rate of motion. For example, equation 1 may be employed to compute scene complexity, equation 2 to compute level of motion, equations 3-5 to compute the appropriate mean square error, and equation 6 to compute compression distortion.

At 504, packet loss distortion is computed. The severity of packet loss may be assessed on the location of a lost packet, whether the lost packet belongs to an I frame or a P frame, and/or whether a reference frame has been received. For example, for each lost packet, the location of the lost macroblocks (MBs) of the lost packet are determined, a loss severity is assigned to the frame depending on the frame type (I frame or P frame) and/or slice/GOB of received packets belonging to the same video frame, and/or loss severity of received frames propagated from a lost reference frame. For a sequence of video frames an average loss (or error) severity may be computed and packet loss distortion is based on the average loss severity, scene complexity and level of motion. In an example embodiment, equation 7 described herein can be employed for computing packet loss distortion.

At 506, packet delay distortion, which may result in a perceptual fluctuation in a video stream caused by time fluctuations such as delay and jitter, is determined. In an example packet loss, such as distortion from delay and/or jitter, is determined by comparing time differences of consecutive frames. For example, time differences can be computed from RTP time stamps and the actual time each frame is received. A timeline of the received times of the video frames can be established. In an example embodiment, a delay and jitter eMOS degradation value is computed based on an average delay. For example, a delay and jitter degradation value of 10 can be assigned for every 100 ms of video frame fluctuation (e.g., if the average delay is 100 ms, then a delay and jitter eMOS degradation value of 10 is used, if the average delay is 200 ms, then a delay and jitter eMOS degradation value of 20 is used, etc.). Those skilled in the art should readily appreciate that any suitable technique for determining time fluctuations may be employed in determining the degradation of perceptual quality of a streaming video. Therefore, in alternative embodiments, more sophisticated methods to quantify the perceptual quality of a video stream due to time fluctuations can be employed.

At 508, an eMOS value (or score) is computed. The eMOS may be based on compression distortion or packet loss distortion, or based on any combination of compression distortion, packet loss distortion, and delay distortion such as compression distortion and packet delay distortion, packet loss distortion and packet delay distortion, or compression distortion, packet delay distortion, and packet delay distortion. For example, eMOS may equal 100−compression distortion−packet loss distortion−packet delay distortion.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
video quality monitoring logic operable to receive data representative of a video stream that comprises a plurality of frames and to produce data representative of an estimated mean opinion score for the video stream;
wherein the video quality monitoring logic is operable to decode a header of the plurality and frames and to determine, from the header and the plurality of frames, a frame rate for the video stream and a mean square error for frames belonging to the plurality of frames;
wherein video quality monitoring logic is operable to determine a scene complexity for the video stream;
wherein the video quality monitoring logic is operable to determine a level of motion for the video stream;
wherein the video quality monitoring logic is operable to determine compression distortion for the video stream from an average of the mean square error for frames belonging to the plurality of frames, the scene complexity, the level of motion, and the frame rate for the video stream;
wherein the video quality monitoring logic is operable to determine packet loss distortion in accordance with an average loss severity of lost packets, the scene complexity, and the level of motion, wherein the average loss severity of the lost packets is based on one or more of a location of the lost packets relative to the plurality of frames comprising the video stream, and the frame rate for the video stream, wherein the packet loss distortion is weighted relative to the scene complexity and the level of motion for the video stream in accordance with a scalar multiple of the scene complexity and the level of motion, the lost packets belonging to an I frame of the video stream, the lost packets belonging to a P frame of the video stream, and a reference frame being received; and
wherein the video quality monitoring logic is operable to determine a mean square error for frames belonging to the plurality of frames base on the compression distortion and the packet loss distortion.

2. The apparatus set forth in claim 1, wherein a mean square error for an intra-coded picture frame is based on bits per pixel and scene complexity.

3. The apparatus set forth in claim 1, wherein a mean square error for a predicted picture frame is based on bits per pixel, scene complexity, level of motion, and an average quantization parameter for predicted picture frame.

4. An apparatus, comprising:
video quality monitoring logic operable to receive data representative of a video stream that comprises a plurality of frames and to produce data representative of an estimated mean opinion score for the video stream;
wherein the video quality monitoring logic is operable to decode a header of the plurality and frames and to determine, from the header and the plurality of frames, a frame rate for the video stream and a mean square error for frames belonging to the plurality of frames;
wherein video quality monitoring logic is operable to determine a scene complexity for the video stream, wherein the video quality monitoring logic is operable to determine the scene complexity in accordance with:

$$C = \frac{\text{Bits}_I}{40 \times FS \times 0.9^{QP_I}} \text{ and } C \in [0, 1]$$

where $\text{Bits}_I$ is number of bits of a coded Intra (I-) frame; $QP_I$ is an average quantization parameter of an I-frame; and FS is a frame size in number of pixels;
the video quality monitoring logic is operable to determine the level of motion in accordance with:

$$M = \frac{\text{Bits}_P}{100 \times FS \times C^{1.2} \times 0.87^{QP_P}} \text{ and } M \in [0, 1]$$

where C is the scene complexity of the video; $\text{Bits}_P$ is a number of bits of a coded Inter (P-) frame; $QP_P$ is an average quantization parameter of a P-frame; and FS is the frame size in number of pixels; and
the video quality monitoring logic is operable to determine the packet loss distortion $$DMOS_{pktloss} = MOS \times \frac{\text{avg(error\_severity)}}{\text{MAX}_{pkt\_loss\_severity\_l}} \times \frac{1.5}{C \times M};$$

wherein the video quality monitoring logic is operable to determine a level of motion for the video stream;
wherein the video quality monitoring logic is operable to determine compression distortion for the video stream from an average of the mean square error for frames belonging to the plurality of frames, the scene complexity, the level of motion, and the frame rate for the video stream;
wherein the video quality monitoring logic is operable to determine packet loss distortion in accordance with an average loss severity of lost packets, the scene complexity, and the level of motion, wherein the average loss severity of the lost packets is based on one or more of a location of the lost packets relative to the plurality of frames comprising the video stream, the lost packets belonging to an I frame of the video stream, the lost packets belonging to a P frame of the video stream, and a reference frame being received; and
wherein the video quality monitoring logic is operable to determine a mean square error for frames belonging to the plurality of frames base on the compression distortion and the packet loss distortion.

5. The apparatus set forth in claim 1, wherein packet loss distortion is based on location of lost packets.

6. The apparatus set forth in claim 5, wherein the packet loss distortion is further based on whether a lost frame is an intra coded picture frame or a predicted picture frame.

7. The apparatus set forth in claim 6, wherein packet loss distortion is further based on whether a reference from was received for the lost frame.

8. The apparatus set forth in claim 7, wherein packet loss distortion is determined from an average error severity of lost packets, a maximum packet loss severity, scene complexity, and level of motion.

9. The apparatus set forth in claim 8, wherein the estimated mean opinion score is based on compression distortion, packet loss distortion, and packet delay distortion.

10. The apparatus set forth in claim 9, wherein the packet delay distortion is based on an average delay over a predetermined time period.

11. The apparatus set forth in claim 8, wherein the estimated mean opinion score is based on compression distortion, and packet delay distortion.

12. Logic encoded in a non-transitory computer readable medium for execution by a processor, and when executed operable to:
determine scene complexity C for a video stream that comprises a plurality of video frames;
determine a level of motion M for the video stream;
decode a header of the plurality of frames to determine, from the header and the plurality of frames a frame rate for the video stream;
determine a location and a severity level for the lost packets based on the decoding of the header and the plurality of frames; and
determine packet loss distortion based on an average error severity for the lost packets, a maximum packet loss severity, a complexity of the video stream, a level of motion of the video stream, and the frame rate for the video stream, wherein the packet loss distortion is weighted relative to the scene complexity and the level of motion for the video stream in accordance with:

$$DMOS_{pktloss} = MOS \times \frac{\text{avg(error\_severity)}}{\text{MAX}_{pkt\_loss\_severity\_l}} \times \frac{1.5}{C \times M};$$

and
determine an estimated mean opinion score for the video stream based on the packet loss distortion.

13. The logic set forth in claim 12, wherein packet loss distortion is based on location of lost packets.

14. The logic set forth in claim 13, wherein the packet loss distortion is further based on whether a lost frame is an intra coded picture frame or a predicted picture frame.

15. The logic set forth in claim 14, wherein packet loss distortion is determined from an average error severity of lost packets, a maximum packet loss severity, scene complexity, and level of motion.

16. The logic set forth in claim 12, wherein the logic is further operable to
determine a mean square error for frames belonging to the plurality of video frames; and
determine a compression distortion for the video stream based on an average of the mean square error for frames belonging to the plurality of frames, the scene complexity of the video stream, the level of motion of the video stream, and the frame rate for the video stream;

wherein the video quality monitoring logic determines the estimated mean opinion score based on the compression distortion and packet loss distortion.

17. The logic set forth in claim 13, wherein the estimated mean opinion score is base on compression distortion, packet loss distortion, and packet delay distortion.

\* \* \* \* \*

UNITED STATES PATENT AND TRADEMARK OFFICE
CERTIFICATE OF CORRECTION

PATENT NO.        : 9,723,266 B1
APPLICATION NO.   : 13/290649
DATED             : August 1, 2017
INVENTOR(S)       : Jing Hu It is certified that error appears in the above-identified patent and that said Letters Patent is hereby corrected as shown below:

On the Title Page

In item (56), in Column 2, under "Other Publications", Line 9, delete "Xao" and insert -- Xiao --, therefor.

In the Drawings

On sheet 2 of 2, in Figure 5, in reference numeral 506, Line 4, delete "DISORTION" and insert -- DISTORTION --, therefor.

In the Specification

In Column 7, Line 33, delete "1st" and insert -- $1^{st}$ --, therefor.

In Column 7, Line 34, delete "2nd" and insert -- $2^{nd}$ --, therefor.

In Column 7, Line 36, delete "3rd" and insert -- $3^{rd}$ --, therefor.

In the Claims

In Column 12, Line 61, in Claim 1, delete "base" and insert -- based --, therefor.

In Column 13, Line 66, in Claim 4, delete "base" and insert -- based --, therefor.

In Column 14, Line 7, in Claim 7, after "reference" delete "from".

In Column 15, Line 5, in Claim 17, delete "base" and insert -- based --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*